(12) United States Patent
Heuer et al.

(10) Patent No.: US 7,627,586 B2
(45) Date of Patent: Dec. 1, 2009

(54) METHOD FOR ENCODING A STRUCTURED DOCUMENT

(75) Inventors: Jörg Heuer, München (DE); Andreas Hutter, München (DE); Andrea Kofler-Vogt, Kolbermoor (DE)

(73) Assignee: Siemens Aktiengesellschaft, Munich (DE)

( * ) Notice: Subject to any disclaimer, the term of this patent is extended or adjusted under 35 U.S.C. 154(b) by 451 days.

(21) Appl. No.: 10/548,262

(22) PCT Filed: Feb. 27, 2004

(86) PCT No.: PCT/EP2004/001992

§ 371 (c)(1),
(2), (4) Date: Jan. 31, 2006

(87) PCT Pub. No.: WO2004/079589

PCT Pub. Date: Sep. 16, 2004

(65) Prior Publication Data

US 2006/0235862 A1    Oct. 19, 2006

(30) Foreign Application Priority Data

Mar. 4, 2003    (DE) ................................ 103 09 336

(51) Int. Cl.
*G06F 7/00* (2006.01)
(52) U.S. Cl. ...................... 707/101; 709/206
(58) Field of Classification Search ......... 707/100–102, 707/200; 709/206, 207, 246, 217–219
See application file for complete search history.

(56) References Cited

U.S. PATENT DOCUMENTS 6,990,514 B1 * 1/2006 Dodrill et al. ............... 709/206
2002/0159519 A1   10/2002 Tabatabei et al.
2002/0170070 A1   11/2002 Rising, III et al.
2003/0009472 A1 *  1/2003 Azami et al. ................. 707/101
2003/0028557 A1    2/2003 Walker et al.
2003/0046317 A1 *  3/2003 Cseri et al. .................. 707/513

(Continued)

FOREIGN PATENT DOCUMENTS

DE    WO 02/062070 A    8/2002

(Continued)

OTHER PUBLICATIONS

Niedenneier U et al., "An MPEG-7 tool for compression and streaming of XML data", Proc. IEEE International Conference on Multimedia and Expo, vol. 1, Aug. 26, 2002, pp. 521-524, XP010604420, Lausanne, Switzerland, Abstract p. 5222, left-hand column, line 39-line 51.

(Continued)

*Primary Examiner*—Wilson Lee
(74) *Attorney, Agent, or Firm*—Harness, Dickey & Pierce, P.L.C.

(57) ABSTRACT

A method is for encoding a structured document, particularly an XML document, during which the contents of the document are converted into a binary representation. This binary representation is divided into encoding units, which form an encoded data flow and can be read out from the encoded data flow. The encoded data flow contains configuration data, with which configuration information concerning the division of the binary representation into encoding units can be read out before the reading out of one of more encoding units.

29 Claims, 3 Drawing Sheets

U.S. PATENT DOCUMENTS

2003/0202697 A1* 10/2003 Simard et al. ............... 382/195
2004/0111677 A1* 6/2004 Luken et al. ................ 715/523

FOREIGN PATENT DOCUMENTS

DE WO 03/001404 A 1/2003
JP 2000-163885 A 6/2000

OTHER PUBLICATIONS

Girardot M et al., "Efficient representation and streaming of XML content over the Internet medium", Proc. IEEE International Conference on Multimedia and Expo, Jul. 30, 2000, pp. 67-70, XP010511404, New York, NY, USA, ISBN: 0-7803-6536-4, Abstract, p. 67, right-hand column, line 24-line 43; p. 68, left-hand column, line 1- line 22; p. 68, right-hand column, line1-line 10; figure 1; p. 69, right-hand column, line 15-line 31; figure 2; p. 70, right-hand column, line 1-line 6.

Text of ISO/IEC FCD 15938-1 Information Technology—Multimedia Content Description Interface—Part 1 Systems, ISO/IEC JTC1/SC29/WG11 MPEG01/N4001, XX, XX, Mar. 2001, pp. 1s-2, I, XP001001465, cited in the application Abschnitt 5.2:Access Unit.

J. Heuer, C. Thienot, M. Wollborn, "Binary Format", In "Introduction to MPEG-7", Editors: B. S. Manjunath, P. Salembier, T. Sikora, John Wiley & Sons, West Sussex, 2002, S. 61-80.

U. Niedemeier, J. Heuer, A. Hutter, W. Stechele, A. Kaup An MPEG-7 Tool For Compensation and Streaming of XML Data, IEEE Intern. Conf. on Multimedia & Expo, Bd. 1, Aug. 2002, p. 521-524.

Girardot M et al "Efficient representation and streaming of xml content over the Internet medium", Proc. IEEE Intern. Conf. on Multimedio and Expo, Jul. 2000, p. 67-70.

* cited by examiner

```
<dia:Description>
<gBSDUnit syntacticalLabel=":MV4:VO" start="0" length="18"/>
<gBSDUnit syntacticalLabel=":MV4:I_VOP" start="18" length="4641"/>
<gBSDUnit syntacticalLabel=":MV4:P_VOP" start="4659" length="98" marker=":ABL:0 :ABL:4"/>
<gBSDUnit syntacticalLabel=":MV4:P_VOP" start="4796" length="178" marker=":ABL:0 :ABL:4"/>
<!-- ... and so on ... -->
</dia:Description>
```

FIG 4

| Filter specification for context path | Bit pattern of the context path |
|---|---|
| /dia:Description/gBSDUnit [*] / @marker/ | 11010 |

FIG 5

```
<EncoderConfig>
<CodingOrder>
<AccessUnit>
<Nodes type="gBSDUnit"/>
<FragmentUpdateUnit quantity="1">
<ContextModeCode value="001"/>
<Nodes>
<selector ref="./@marker"></selector>
</Nodes>
</FragmentUpdateUnit>

<FragmentUpdateUnit quantity="1">
<ContextModeCode value="001"/>
<Nodes>
<selector ref=".">
<except ref="./@marker"/>
</selector>
</Nodes>
</FragmentUpdateUnit>
</AccessUnit>
</CodingOrder>
</EncoderConfig>
```

METHOD FOR ENCODING A STRUCTURED DOCUMENT

This application is the national phase under 35 U.S.C. § 371 of PCT International Application No. PCT/EP2004/001992 which has an International filing date of Feb. 27, 2004, which designated the United States of America and which claims priority on German Patent Application number DE 103 09 336.2 filed Mar. 4, 2003, the entire contents of which are hereby incorporated herein by reference.

FIELD

The invention generally relates to a method for encoding a structured document, a decoding method and/or a corresponding encoding and/or decoding device. For example, it relates to one in which a binary representation of a structured, in particular XML-based document (XML=Extensible Markup Language), is encoded and/or decoded with the aid of a scheme.

BACKGROUND

Encoding and decoding methods are described for example in publications concerning the MPEG-7 standard, in particular in document [1]. These methods allow the contents of the document, in particular elements and/or attributes and/or data types, to be determined with the aid of bit patterns in an encoded data flow. In this case, the encoded contents are stored in so-called FUU's (FUU—fragment update unit), in which the entire content of the element and/or attribute and/or data type need not be contained in the FUU. Parts of this element and/or attribute and/or data type can be encoded in subsequent FUU's.

The content of XML documents is frequently further processed by a recipient, and prepared for example for display. For this purpose, it is often the case that only specific elements and/or attributes and/or data types are filtered out from the XML document. The process of filtering can be specified for instance in a so-called XSLT (XSLT=SML style sheet language transformation).

According to the prior art, it has proven disadvantageous in applications for processing an XML document that in order to filter out contents, the whole document is decoded from the bit flow and is only then filtered. The filtering can be accelerated by way of technologies known from the prior art such that FUU's, which cannot contain the content to be filtered as a result of the information contained in the so-called context path of the FUU, are not decoded. It is however not possibly to reliably determine, on the basis of the context path, which FUU's actually contain the desired content.

SUMMARY

An object of at least one embodiment of the invention is to create a method for encoding a structured document, which enables a more simple and rapid filtering of contents from the document.

With the method according to at least one embodiment of the invention for encoding a structured document, in particular an XML document, the contents of the document are converted into a binary representation. The binary representation is divided into encoding units, which form an encoded data flow, it being possible to read out the encoded units from the encoded data flow. The encoded data flow thus contains configuration data, with which configuration information concerning the division of the binary representation into encoding units can be read out before one or more encoding units are read out.

Therefore, in order to filter out specific contents from the document, it is no longer necessary to decode the entire encoded data flow. Instead, it is already possible to determine from the encoded data flow, which contents the individual encoding units contain. The filtering of a structured document can thus be significantly accelerated.

In at least one example embodiment of the invention, the configuration information, particularly information concerning missing contents, is in predetermined encoding units. It is thus possible to determine from the encoded data flow, which contents are missing in an encoding unit. Thus, there is no need to decode this encoding unit if searches are made during filtering for precisely this missing content.

In at least one further example embodiment, the configuration data is itself encoded in the encoded data flow, as a result of which the encoding efficiency is increased.

In one configuration of at least one example embodiment of the invention, the configuration data is the configuration information, this configuration information being added to the encoded data flow. In particular, the configuration information can be textually encoded in the form of an XML document. Alternatively, the configuration information can be encoded using an MPEG encoding method.

In at least one example embodiment, the configuration data includes references to configuration information, with which configuration information is selected from stored configuration information. The entire configuration information need no longer be transmitted. Instead, this information can be stored in a storage area, which can be accessed by the decoder.

The document to be encoded is preferably an MPEG description flow, in particular an MPEG-7 or MPEG-21 description flow, the encoding units being fragment update units which in turn form access units. A description of the encoding standard MPEG-21 can be found in document [2] for instance. The stored configuration information is preferably contained in profiles of an MPEG standard, in particular of the MPEG-7 or the MPEG-21 standard.

In at least one particular example embodiment, the structured document is an XML document including elements and/or attributes and/or data types. If the configuration information is information concerning missing contents, the missing contents particularly include at least one element and/or one attribute and/or one data type.

In addition to the above-described example embodiments of a method for encoding a data flow, at least one additional example embodiment of the invention further includes a method for decoding an encoded data flow, the method being designed such that a data flow encoded with the encoding method according to at least one embodiment of the invention is decoded. In this case, the configuration information may be, for example, read out from the encoded data flow.

Furthermore, at least one example embodiment of the invention relates to a method for encoding and/or decoding a data flow including the above-described encoding method according to at least one example embodiment of the invention and/or the above-mentioned decoding method according to at least one example embodiment of the invention.

At least one example embodiment of the invention further includes an encoding device, which is designed such that the encoding method according to at least one example embodiment of the invention can be implemented, and/or a decoding device, which is designed such that the decoding method according to at least one example embodiment of the invention can be implemented. Furthermore, at least one example embodiment of the invention relates to an encoding and decoding device comprising an inventive encoding device and an inventive decoding device.

BRIEF DESCRIPTION OF THE DRAWINGS

Example embodiments of the invention are described below in more detail with reference to the attached drawings, in which:

FIG. 4 shows an example of a filter specification for filtering out specific information from the binary representation of the XML document in FIG. 3; and FIG. 5 shows an exemplary representation of an encoding configuration formatted as an XML document which can be used in the method according to at least one example embodiment of the invention.

DETAILED DESCRIPTION OF THE EXAMPLE EMBODIMENTS

Figure 1:
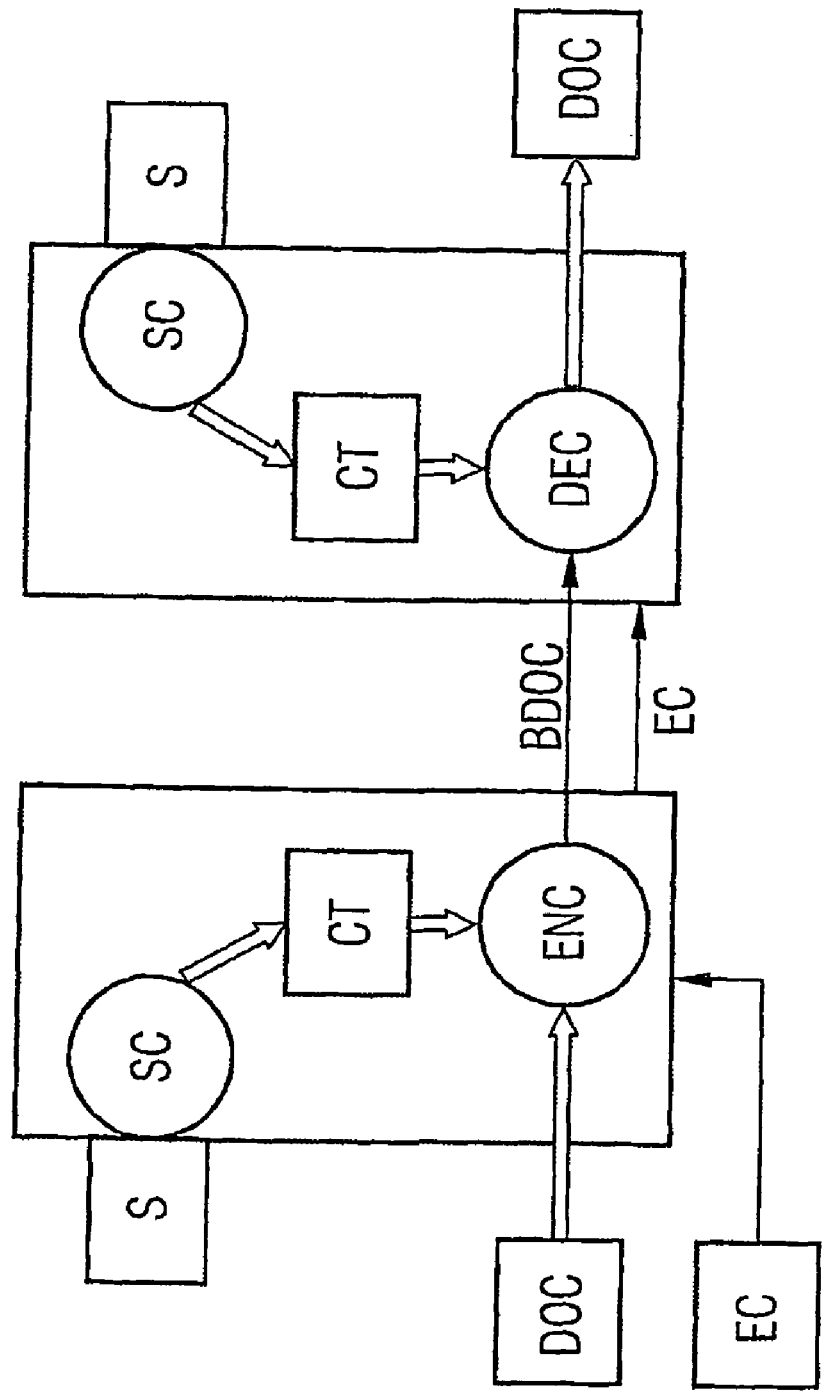
FIG. 1 shows a schematic representation of an encoding and decoding system, in which the encoding and decoding method according to at least one example embodiment of the invention is implemented.

FIG. 1 shows an example encoding and decoding system according to at least one example embodiment of the invention, with an encoder ENC and a decoder DEC, with which XML documents DOC are encoded and/or decoded. Both the encoder and the decoder have a so-called scheme S in which elements and types of the XML document used for communication are declared and defined.

Code tables CT are generated from the scheme S by way of corresponding scheme compilations SC in the encoder and decoder. When the XML document DOC is encoded, the contents of the XML document are assigned binary codes by way of the code tables.

Subsequently the codes are divided in the encoder into so-called fragment update units FUU, which are described in more detail in relation to FIG. 2. The division of the codes into FUU's depends on the configuration of the encoder. The document DOC is thus converted into an encoded binary format BDOC which is subsequently transmitted to the decoder and then in turn decoded with the aid of the code table CT, thereby reproducing the original document DOC.

The method according to at least one example embodiment of the invention includes information EC concerning the division of the contents of the XML document into FUU's carried out by the encoder being transmitted prior to or in parallel with the transmission of the binary representation of the XML document.

Figures 2, 3:
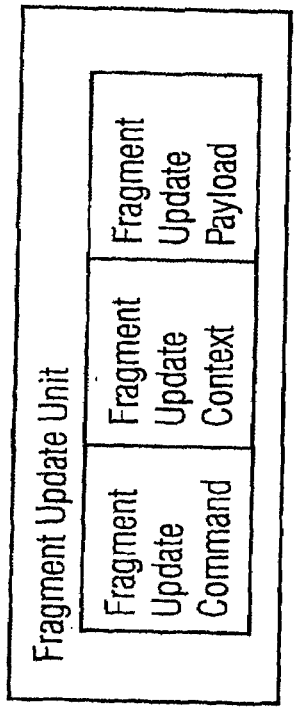
FIG. 2 shows a schematic representation of the structure of an FUU.
FIG. 3 shows an example of a syntax of an XML document, from which information is to be filtered.

FIG. 2 shows the components of a fragment update unit FUU, which represents the binary format of an MPEG 7 description flow. A unit of this type contains a fragment update command, in which is specified which operation is to be carried out in one node of the description tree of an XML document. Furthermore, the unit includes a fragment update context, which contains among others a so-called context path, by which the path in the description tree of the document is specified to the node at which the fragment update command is to be implemented.

The context path determines which information can be maximally contained in an FUU. The FUU finally still contains the fragment update payload, i.e. the encoded information to be processed in the corresponding node. For a more precise description of the structure of an FUU, reference should be made to document [3].

An encoded data flow includes a plurality of fragment update units of this type, these FUU's being in turn combined into so-called access units. In the embodiment of the method according to the invention described here, in addition to the FUU's, configuration information EC is still transmitted in the encoded data flow to the decoder, the configuration information specifying how an XML document is divided in FUU's.

FIG. 3 reproduces an example of a content of an XML document to be encoded. The document comprises among other things four elements termed as "gBSDUnit", two of these elements containing a so-called marker attribute. FIG. 4 shows a filter specification, according to which the document encoded using the method according to at least one example embodiment of the invention is to be filtered. The filter specification determines that a context path is to be sought which contains the element gBDSUnit with the marker attribute. In the present case, this specification corresponds to the bit pattern "11010".

To filter this information from the encoded data flow with the least possible decoding effort, the configuration information of the encoder displayed in XML format in FIG. 5 is transmitted to the decoder. This specifies that an access unit contains only gBSDUnits (line 4: <Nodes type="gBSDUnit"/>). Furthermore, it is established that an access unit contains two fragment update units, the first fragment update unit containing a marker attribute of a gBSDUnit in each instance (line 8: <selector ref="./@marker"></selector>) and the second fragment update unit containing a gBSDUnit in each instance, whereby in the case of gBSDUnits containing marker attributes, these attributes are not stored in this fragment update unit, (line 16: <except ref="./@marker"/>). By transmitting the information represented in FIG. 5 to the decoder DEC, specific marker attributes can be sought significantly faster, since:

the decoder knows that marker attributes are not contained in FUU's containing gBSDUnits, and the gBSDUnits contained in the fragment update payloads need not be decoded for this purpose, the decoder must only decode FUU's, the context path of which (see FIG. 4) comprises the bit pattern of a context path to a marker attribute.

As the comparison of bit patterns can be implemented significantly faster than the decoding of fragment update payloads, the transmission of the configuration information of the encoder can allow the filtering to accelerate significantly.

BIBLIOGRAPHY

[1] Text of ISO/IEC FCD 15938-1 Information Technology—Multimedia Content Description Interface—Part 1, Systems.

[2] Text of ISO/IEC CD 21000-7 Information Technology—Multimedia Framework—Part 7, Digital Item Adaptation.

[3] J. Heuer, C. Thienot, M. Wollborn, "Binary Format", in "Introduction to MPEG-7", Editors: B. S. Manjunath, P. Salembier, T. Sikora, John Wiley & Sons, West Sussex, 2002, pages 61-80.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Method for encoding a structured document using an encoding device, comprising:
    converting the contents of the document into a binary representation;
    dividing the binary representation into encoding units, which form an encoded data flow, readable out from the encoded data flow; and
    including configuration data in the encoded data flow, by which configuration information concerning the division of the binary representation into encoding units is readable out prior to reading out one or more encoding units.

2. Method according to claim 1, wherein the configuration information contains information concerning missing contents of the document in predetermined encoding units.

3. Method according to claim 2, wherein the encoded data flow contains references to at least one of the locations at which the missing contents of the document are located in the encoded data flow, and to the encoding units containing the missing contents of the document.

4. Method according to claim 1, wherein the configuration data is encoded.

5. Method according to claim 1, wherein the configuration data is the configuration information and is added to the encoded data flow.

6. Method according to claim 5, wherein the configuration information is textually encoded in the form of an XML document.

7. Method according to claim 5, wherein the configuration information is encoded with an MPEG encoding method.

8. Method according to claim 1, wherein the configuration data includes references to configuration information, with which configuration information is selected from stored configuration information.

9. Method according to claim 1, wherein the document is an MPEG description flow, the encoding units being fragment update units which in turn form access units.

10. Method according to claim 8, wherein the stored configuration information is contained in profiles of an MPEG standard.

11. Method according to claim 1, wherein the structured document is an XML document including at least one of elements, attributes and data types.

12. Method according to claim 2, wherein the structured document is an XML document including at least one of elements, attributes and data types and wherein missing contents of the document comprise at least one element, attribute and data type.

13. Method for decoding an encoded data flow, comprising decoding a data flow encoded with a method according to claim 1.

14. Method according to claim 13, wherein the configuration information is read out.

15. Method for encoding and decoding a data flow, comprising encoding a data flow with a method according to claim 1 and decoding the encoded data flow.

16. Encoding device, designed to implement a method according to claim 1.

17. Decoding device, designed to implement a method according to claim 13.

18. Encoding and decoding device, designed to implement a method according to claim 15.

19. The method of claim 1, wherein the document is an XML document.

20. Method according to claim 2, wherein the configuration data is the configuration information and is added to the encoded data flow.

21. Method according to claim 20, wherein the configuration information is textually encoded in the form of an XML document.

22. Method according to claim 20, wherein the configuration information is encoded with an MPEG encoding method.

23. Method according to claim 1, wherein the document is at least one of an MPEG-7 and an MPEG-21 description flow, the encoding units being fragment update units which in turn form access units.

24. Method according to claim 9, wherein the stored configuration information is contained in profiles of an MPEG standard.

25. Method according to claim 23, wherein the stored configuration information is contained in profiles of at least one of the MPEG-7 and the MPEG-21 standard.

26. Device for encoding a structured document, comprising:
    means for converting the contents of the document into a binary representation;
    means for dividing the binary representation into encoding units, which form an encoded data flow, readable out from the encoded data flow; and
    means for including configuration data in the encoded data flow, by which configuration information concerning the division of the binary representation into encoding units is readable out prior to reading out one or more encoding units.

27. The device of claim 26, wherein the document is an XML document.

28. Device for encoding and decoding a structured document, comprising:
    means for converting the contents of the document into a binary representation;
    means for dividing the binary representation into encoding units, which form an encoded data flow, readable out from the encoded data flow;
    means for including configuration data in the encoded data flow, by which configuration information concerning the division of the binary representation into encoding units is readable out prior to reading out one or more encoding units; and
    means for decoding the encoded structured document.

29. The device of claim 28, wherein the document is an XML document.

* * * * *